United States Patent [19]

Arai et al.

[11] 4,419,404
[45] Dec. 6, 1983

[54] MAGNETIC RECORDING MEDIA AND PROCESS OF PRODUCING THEM

[75] Inventors: Yoshihiro Arai; Akira Nahara, both of Odawara, Japan

[73] Assignee: Fuji Photo Film Co., Ltd., Kanawaga, Japan

[21] Appl. No.: 348,883

[22] Filed: Feb. 16, 1982

[30] Foreign Application Priority Data

Feb. 16, 1981 [JP] Japan .................................. 56-21652

[51] Int. Cl.³ .............................................. G11B 5/72
[52] U.S. Cl. ...................................... 428/336; 427/41; 427/131; 427/132; 428/212; 428/409; 428/421; 428/422; 428/695; 428/900; 360/134; 360/135; 360/136
[58] Field of Search ............... 428/695, 900, 212, 409, 428/336, 421, 422; 427/41, 131, 132; 360/134-136

[56] References Cited

U.S. PATENT DOCUMENTS

| | | | |
|---|---|---|---|
| 4,171,399 | 10/1979 | Allen et al. | 427/131 |
| 4,252,848 | 2/1981 | Datta | 427/41 |
| 4,267,238 | 5/1981 | Chernega | 428/695 |
| 4,268,556 | 5/1981 | Pedrotty | 428/695 |

FOREIGN PATENT DOCUMENTS 54-21249  7/1979  Japan .................................. 427/131

*Primary Examiner*—Ellis P. Robinson
*Attorney, Agent, or Firm*—Sughrue, Mion, Zinn, Macpeak & Seas

[57] ABSTRACT

A magnetic recording medium and a process for producing it is disclosed. The medium is comprised of a non-magnetic flexible support base and a magnetic layer formed on a surface of the support base. The magnetic layer is preferably in the form of a thin, ferromagnetic metal film formed by vapor deposition. An overcoat layer of a fluorine-containing organic material is formed directly on the magnetic layer. The fluorine content of the overcoat layer continuously and gradually decreases in the direction toward the magnetic layer. Accordingly, high fluorine content near the surface of the overcoat layer provides improved smoothness near the surface whereas the lower fluorine content near the interface of the overcoat with the magnetic layer allows for strong adhesion between the overcoat and the underlying magnetic layer substrate. The media is formed by providing the flexible support base, forming the magnetic layer on the surface of the support base and forming the overcoat layer on the magnetic layer by performing plasma polymerizations of a fluorine-free monomer gas and a fluorine-containing monomer gas with a time lag. The overcoat layer is formed such that the fluorine content continually increases in a direction away from the magnetic layer.

5 Claims, 2 Drawing Figures

MAGNETIC RECORDING MEDIA AND PROCESS OF PRODUCING THEM

FIELD OF THE INVENTION

This invention relates to magnetic recording media such as magnetic recording tapes, magnetic recording discs, etc., used for magnetic recording devices and a process of producing them. More particularly, the invention relates to magnetic recording media having improved corrosion resistance, smoothness, and abrasion resistance and a process of producing such magnetic recording media.

BACKGROUND OF THE INVENTION

Many conventional magnetic recording media can be generally referred to as coated type magnetic recording media, which are usually produced by coating the surface of a non-magnetic support with a liquid coating composition prepared by dispersing a magnetic powder of an oxide such as $\gamma\text{-Fe}_2\text{O}_3$, Co-doped $\gamma\text{-Fe}_2\text{O}_3$, $\text{Fe}_3\text{O}_4$, Co-doped $\text{Fe}_3\text{O}_4$, a berthollide compound of $\gamma\text{-Fe}_2\text{O}_3$ and $\text{Fe}_3\text{O}_4$, the Co-doped berthollide compound, $\text{CrO}_2$, etc., or a magnetic powder of an alloy of Fe, Ni, Co, etc., in an organic binder such as a vinyl chloridevinyl acetate copolymer, a styrene-butadiene copolymer, an epoxy resin, a polyurethane resin, etc., and drying to form a magnetic layer, as disclosed in U.S. Pat. No. 4,135,016.

Recently, due to an increase in the amount of information to be recorded, there has been a strong desire to make practical use of magnetic recording media suitable for high density recording. Accordingly, there has been keen interest in the so-called thin layer type magnetic recording media prepared by forming a thin ferromagnetic metal layer on the support by vapor deposition, sputtering, ion plating, metal plating, etc., without using a binder, as disclosed in U.S. Pat. Nos. 3,342,632 and 3,342,633. With the progress in the development and research on these magnetic recording media, there have been various proposals regarding their practical use.

However, the foregoing thin layer type magnetic recording media are undesirable because scratches are liable to form on the surfaces due to contact with the magnetic heads, guide rollers, liners, etc. The media is also undesirable because of little mechanical strength, a large coefficient of friction, poor tape running properties and also insufficient weather resistance.

The surface of metal layers is generally very smooth and, thus, the smoothness quantitatively determined by conventional methods would not be practically useful. One approach to determination of smoothness is by evaluating lubricating property and various methods have been proposed, but no effective methods for quantitatively determining the lubricating property are available at present. Such property is generally evaluated totally in terms of tape running properties, but the smoothness of the metal layer does not necessarily correspond to the running property in view of occurrence of stick-slip and the like. On the other hand, the metal layer tends to peel off from the support with many cracks of the metal layer when the tape having a metal layer is passed repeatedly while contacting with magnetic heads, guidepins, etc. Such peeling off can be generally evaluated by test for determining adhesion strength using an adhesive tape.

Various attempts have been made at eliminating these disadvantages by forming overcoats on the magnetic recording media by various systems such as a vacuum vapor deposition system, a coating system, etc. Examples of such methods include forming an overcoat of a solid lubricating agent by sputtering or ionplating as disclosed in U.S. Pat. No. 4,277,540; forming an overcoat of $\text{SiO}_2$ by sputtering as disclosed in U.S. Pat. No. 4,268,369; improving protective properties by liquid treatment as disclosed in U.S. Pat. No. 4,272,563; forming an overcoat by spin-coating of a fluorine-containing compound as disclosed in U.S. Pat. No. 4,268,556; improving the surface of the non-magnetic support by plasma polymerization of perfluorocyclobutane and the like as disclosed in U.S. Pat. No. 4,188,426; and forming an overcoat by plasma poymerization of $\text{C}_2\text{F}_4$ as disclosed in *J. Applied Polymer Science*, Vol. 23, 2627 (1979). Other examples of methods for forming overcoats include forming an overcoat of a metal such as rhodium, chromium, etc., a high-hardness inorganic material such as WC, $\text{TiO}_2$, $\text{CaF}_2$, $\text{MgF}_2$, etc., or a lubricant such as metal soap, etc., by vapor deposition and a method of forming an overcoat of a polymer by coating. Furthermore, in addition to the foregoing method of forming a single overcoat, there is a method of forming multilayer overcoats each layer of which has a separate function. One such method involves the use of three overcoat layers, the lower overcoat layer being a layer having good adhesion with a substrate or a magnetic recording layer, the intermediate overcoat layer being a layer imparting toughness and high hardness to the magnetic recording medium, and the upper overcoat layer being a layer having excellent smoothness. For the reasons described above, the application of a single overcoat does not give satisfactory results. The application of multilayer overcoats also has disadvantages in that the layer or layers peel apart due to poor adhesion between the layers. Furthermore, the formation of such multilayer overcoats is complicated.

SUMMARY OF THE INVENTION

An object of this invention is to eliminate the foregoing disadvantages of conventional techniques and to provide a magnetic recording medium having excellent abrasion resistance, weather resistance and tape running property.

Another object of this invention is to provide a process for producing the above-described magnetic recording medium.

Still another object of this invention is to provide a media comprising a magnetic recording medium comprising a non-magnetic, flexible support base, a magnetic layer formed on the support, and a fluorine-containing organic material layer directly formed on the magnetic layer, the fluorine content in the fluorine-containing organic material layer continuously and gradually decreasing in the direction toward the magnetic layer.

Yet another object of this invention is to provide a process for producing a magnetic recording medium which comprises forming a thin magnetic layer on a non-magnetic flexible support base by a vacuum obliquely injecting vapor deposition and then performing plasma polymerization of a fluorine free monomer gas and a fluorine-containing monomer gas with a time lag on the thin magnetic layer to form on the thin magnetic layer a fluorine-containing organic material layer wherein the fluorine content continuously and gradually decreases in the direction toward the surface of the thin magnetic recording layer.

DESCRIPTION OF THE PREFERRED EMBODIMENTS

Figure 1:
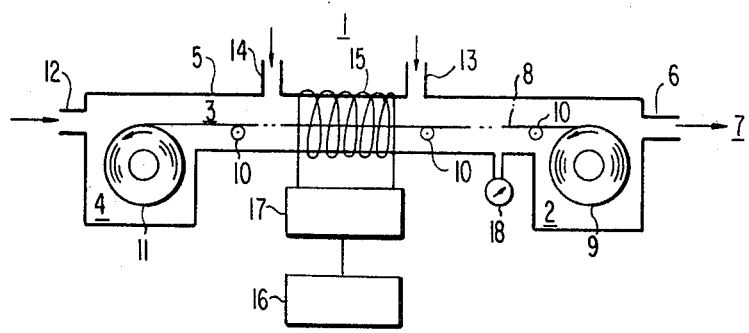
FIG. 1 is a schematic view of a system showing an embodiment of the process of this invention.

The overcoat layer for the magnetic recording medium of this invention has a high lubricating property because it contains a large amount of a fluorine-containing organic material. The fluorine-containing material contributes to the improvement of lubricating property near the surface. The overcoat layer has excellent adhesion with the magnetic layer disposed thereunder since it does not contain fluorine near the interface with the magnetic layer. Furthermore, since the fluorine content of the overcoat layer varies continuously, the layer does not peel off, which occurs when two separate layers, i.e., a fluorine-containing material layer and a fluorine free organic material layer, are used.

The fluorine-containing organic material layer of this invention may contain no fluorine compound near the interface with the magnetic layer. The thickness of the layer is preferably 20-800 Å more preferably 20-400 Å. If the thickness is less than 20 Å, the layer is too thin to obtain the effects of this invention. If the thickness is over 800 Å, the spacing loss caused by the separation of the magnetic layer from the magnetic head becomes so large that it causes a reduction in output level.

The fluorine-containing organic material layer based on this invention is formed by a plasma polymerization method. In such as plasma polymerization method, the polymerization is performed by introducing the vapor of an organic material into the electric discharge of an electrically dissociated gas or directly electrically dissociating the vapor of an organic material and polymerizing the plasma of the organic material thus formed on the surface of the magnetic layer. The layer thus formed has a highly cross-linked structure as compared to a polymer layer produced by an ordinary polymerization reaction. The layer produced in this manner is tough, has a high density and has excellent adhesion to the magnetic layer. Furthermore, the plasma polymerization method can be very easily performed, as distinguishable from a coating method using a solvent. The plasma method can also be used to form an overcoat of a vapor-deposited metal magnetic recording medium. Furthermore, by introducing monomer gases into the plasma polymerization section with a time lag to the recording medium as a substrate, a single step method can be used to obtain an overcoat of a fluorine-containing organic material layer wherein the fluorine content varies continuously in the width direction.

Examples of useful fluorine-containing monomers include $CF_4$, $C_2F_4$, $C_2H_3F$, $C_2H_2F_2$, $C_4F_8$, alkyl group-containing fluorine compounds such as $CF_2CF-Rf$, $CF_2=CF-O-Rf$, $CH_2=CF-O-Rf$, and $CH=CHR-COORf$ (wherein Rf is an alkyl group), $CF_3NO$,

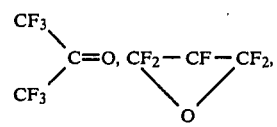

$CF_2S$, etc., preferably, $CF_4$, $C_2F_4$ and $C_4F_8$.

Examples of useful fluorine free monomers include ethylene, vinyl chloride, styrene, chlorobenzene, etc., preferably, ethylene, vinyl chloride and styrene.

Then, the invention will be further explained by referring to the embodiments shown in the accompanying drawings.

FIG. 1 is a schematic view showing the essential portion of a plasma reaction apparatus 1 for performing the process of this invention. As shown in the figure, a casing 5 is composed of a delivery chamber 2, a reaction chamber 3, and a winding chamber 4 which are connected successively. The inside pressure of the casing 5 is reduced to about $10^{-6}$ Torr at the lowest by means of an evacuation system 7 connected to an exhaust pipe 6 in connection with the delivery chamber 2.

A web roll 9 holds a long non-magnetic flexible support 8, a magnetic layer was previously formed on the support by a known method. The roll 9 continuously supplies the support from the delivery chamber 2 into the reaction chamber 3 and the winding chamber 4. The support 8 is guided by a plurality of rollers 10 and the support is wound into a roll form 11 in the winding chamber 4.

Argon gas is supplied as a discharging gas into the reaction chamber 3 from a gas inlet pipe 12 in connection with the winding chamber 4. Furthermore, ethylene gas and tetrafluoroethylene gas are directly supplied to the reaction chamber 3 through a 1st monomer gas inlet pipe 13 and a 2nd monomer gas inlet pipe 14 respectively. The inlets 13 and 14 are disposed apart from each other along the travelling direction of the support 8, high frequency electric power is applied to a coil 15 surrounding the reaction chamber 5 disposed between the inlet pipes 13 and 14. Power is supplied to the coil 15 from a high frequency electric source 16 through a match box 17. After activation of the coil 15 an electric discharge of the argon gas occurs and the plasma of each organic monomer formed by the electric discharge is polymerized on the surface of the magnetic layer to form the overcoat layer. The pressure in casing 5 is monitored by a pressure gauge 18.

As the web support 8 is supplied to the reaction chamber 3, an ethylene component is formed by the polymerization of the plasma of the ethylene gas supplied from the 1st monomer gas inlet 13. The ethylene component attaches to the surface of the magnetic layer. Thereafter, a tetrafluoroethylene component formed by the polymerization of the plasma of the tetrafluoroethylene gas supplied from the 2nd monomer gas inlet begins to attach to the media. The content of the tetrafluoroethylene component attached is gradually increased, and finally an overcoat layer having a surface consisting of tetrafluoroethylene is formed.

Figure 2:
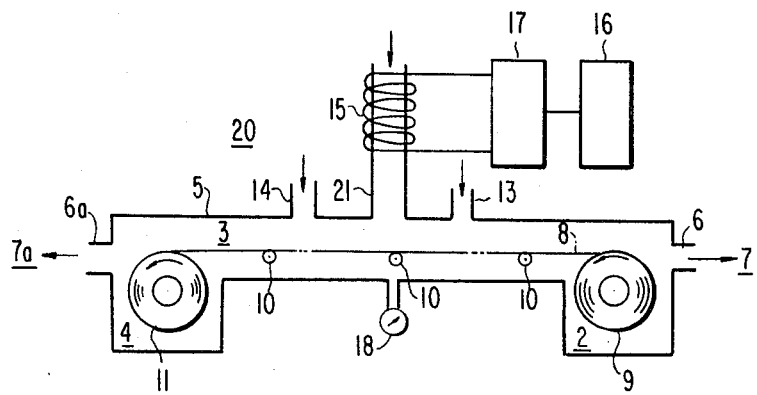
FIG. 2 is a schematic view showing a modification of the embodiment of the process of this invention.

FIG. 2 is a modification of the reaction apparatus based on this invention. The modified points in the reaction apparatus 20 include a gas exhaust pipe 6a connected to an evacuation system 7a which is connected to the winding chamber 11 in place of the gas inlet pipe 12 in FIG. 1. Furthermore, a gas inlet pipe 21 is surrounded by the coil 15 as described above, which is in connection with the reaction chamber 3 between the 1st monomer gas inlet 13 and the 2nd monomer gas inlet pipe 14. In the modified apparatus, argon gas supplied from the gas inlet pipe 21 is discharged within the pipe 21 by the application of a high frequency electric power to the coil 15. By the apparatus 20, the aforesaid plasma polymerizations can be sufficiently performed.

Examples of this invention will be explained below together with a comparative example.

EXAMPLES 1 TO 4

Magnetic recording tapes were prepared using the reaction apparatus as shown in FIG. 1 or 2 according to the conditions shown in Table 1. Parameters such as the still durability, were measured and evaluated. The results are shown in Table 2.

Comparative Example

A magnetic recording tape was prepared using the apparatus as shown in FIG. 1. However, only an argon gas and an ethylene monomer gas were supplied. No tetrafluoroethylene gas was supplied. Parameters such as the still durability, were measured and evaluated. The results are shown in Table 2.

netic tape was stopped and the time required until the regeneration output decayed to the half during stopping was measured.

(2) Number of Scratches: After running the magnetic recording tape forward and backward 20 times in the Comparative Example and 100 times in Examples 1-4 using a video tape recorder, Maclord NV 8310, made by Matsushita Electric Industrial Co., Ltd., scratches formed in the direction of width of the tape were counted by the naked eye, regardless of the length and depth of scratches.

(3) Number of Drop Out: The number of drop out which occurred in one minute in the case of testing the magnetic recording tapes using a video tape recorder, Maclord NV 8310, made by Matsushita Electric Industrial Co., Ltd. was detected using a drop out counter, VD-3, made by Victor Company of Japan, Limited.

From the results shown above, it was confirmed that the magnetic recording tapes of this invention were far superior to the comparative Example on each evaluated item.

EXAMPLE 5

TABLE 1

|  | Example 1 | Example 2 | Example 3 | Example 4 | Comparative Example |
|---|---|---|---|---|---|
| Support | | | | | |
| Material | Polyethylene Terephthalate Film | Same as Example 1 | Same as Example 1 | Same as Example 1 | Same as Example 1 |
| Thickness | 12 μm | 12 μm | 12 μm | 12 μm | 12 μm |
| Width | 20 cm | 20 cm | 20 cm | 20 cm | 20 cm |
| Travelling speed | 0.5 m./min. | 0.5 m./min. | 0.5 m./min. | 0.5 m./min. | 0.5 m./min. |
| Magnetic layer | | | | | |
| Layer-forming System | Vaccum Oblique Vapor Deposition | Same as Example 1 | Sputtering | Same as Example 1 | Same as Example 1 |
| Magnetic Substance | Cobalt | Cobalt | Co + P (3 layers) | Cobalt | Cobalt |
| Layer Thickness | 2000 Å | 1500 Å | 1200 Å | 2000 Å | 2000 Å |
| Plasma polymerization for thin organic material layer | | | | | |
| Gases supplied* | Argon Gas (10 SCCM) Ethylene Gas (6 SCCM) Tetrafluoroethylene Gas (6 SCCM) | Argon Gas (8 SCCM) Ethylene Gas (8 SCCM) Octafluorocyclobutane Gas (8 SCCM) | Argon Gas (8 SCCM) Ethylene Gas (8 SCCM) Tetrafluoroethylene Gas (6 SCCM) | Argon Gas (12 SCCM) Ethylene Gas (8 SCCM) Tetrafluoroethylene Gas (8 SCCM) | Argon Gas (10 SCCM) Ethylene Gas (8 SCCM) — |
| Total Pressure | about 100 mmHg | about 120 mmHg | about 100 mmHg | about 150 mmHg | about 80 mmHg |
| Layer thickness | 300 Å | 330 Å | 310 Å | 310 Å | 300 Å |
| Layer Forming System | FIG. 1 | FIG. 1 | FIG. 1 | FIG. 2 | FIG. 2 |
| Time Lag | 20 sec. | 20 sec. | 20 sec. | 20 sec. | 20 sec. |

*SCCM = Standard Cubic Centimeter

TABLE 2

|  | Example 1 | Example 2 | Example 3 | Example 4 | Comparative Example |
|---|---|---|---|---|---|
| Still Durable Time | After 100 passes 35 min. | After 100 passes 45 min. | After 100 passes 35 min. | After 100 passes 40 min. | After 20 passes 5 min. |
| Number of Scratches | 5 | 3 | 3 | 5 | 15 |
| Number of Drop Out | $3 \times 10^2$ | $3.2 \times 10^2$ | $3 \times 10^2$ | $3 \times 10^2$ | $2 \times 10^3$ |

Each evaluation in Table 2 was performed in the following manner:

(1) Still Durable Time: After running (1 pass) the magnetic recording tape for recording using a video tape recorder, Maclord NV 8310, made by Matsushita Electric Industrial Co., Ltd., the mag- Six magnetic recording tapes were prepared using the reaction apparatus as shown in FIG. 1 according to the conditions shown in Table 3. The support and the magnetic layer used were the same as those of Example 1, except that travelling speeds of 0.5 m/min. and 0.33 m/sec. were used for the process with a time lag of 20 seconds and 30 seconds, respectively. The fluorine contents of the overcoat layer near the surface thereof and near the interface with the magnetic layer were then determined by an XPS (X-ray photospectroscopy) method. The results obtained are also shown in Table 3.

TABLE 3

| Plasma polymerization for thin organic material layer | Tape No. 1 | Tape No. 2 | Tape No. 3 | Tape No. 4 | Tape No. 5 | Tape No. 6 |
| --- | --- | --- | --- | --- | --- | --- |
| Gasses supplied | | | | | | |
| Argon Gas | 8 SCCM | 8 SCCM | 8 SCCM | 8 SCCM | 8 SCCM | 8 SCCM |
| Ethylene Gas | 8 SCCM | 8 SCCM | 8 SCCM | 8 SCCM | 8 SCCM | 8 SCCM |
| $C_2F_4$ Gas | 8 SCCM | 10 SCCM | 12 SCCM | 8 SCCM | 10 SCCM | 12 SCCM |
| Total Pressure (mmHg) | 120 | 130 | 150 | 120 | 130 | 150 |
| Time Lag (sec.) | 20 | 20 | 20 | 30 | 30 | 30 |
| Layer Thickness | 320 Å | 330 Å | 350 Å | 400 Å | 440 Å | 460 Å |
| Fluorine Content (%) | | | | | | |
| Near Surface | 60 | 60 | 63 | 63 | 62 | 65 |
| Near Interface | 5 | 6 | 6 | 0 | 0 | 3 |

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic, flexible support;
   a thin ferromagnetic metal layer formed on a surface of said support;
   an overcoat layer formed on a surface of said ferromagnetic metal layer, said overcoat layer comprising a fluorine-containing organic material, wherein the fluorine content of said overcoat layer continuously and gradually increases in a direction away from said ferromagnetic metal layer.

2. A magnetic recording medium as claimed in claim 1, wherein said ferromagnetic metal layer is formed by vacuum vapor deposition, sputtering, ion plating, or metal plating.

3. A magnetic recording medium as claimed in claim 1, wherein said overcoat layer comprised of said fluorine-containing organic material is formed by forming a plasma polymerization of a fluorine free monomer and plasma polymerization of a fluorine-containing monomer with a time lag with respect to said plasma polymerization of said fluorine free monomer.

4. A magnetic recording medium as claimed in any of claims 1, 2 or 3, wherein said overcoat layer has a thickness of 20 to 800 Å.

5. A magnetic recording medium as claimed in claim 4, wherein said thickness is within the range of 20 to 400 Å.

* * * * *